United States Patent [19]
Smith et al.

[11] Patent Number: 5,722,454
[45] Date of Patent: Mar. 3, 1998

[54] FLUID FLOW FUSE

[75] Inventors: Robert P. Smith, Lake Forest; Hubert Q. Stedman, Santa Ana, both of Calif.

[73] Assignee: Q-Fuse LLC, Newport Beach, Calif.

[21] Appl. No.: 615,156

[22] Filed: Mar. 12, 1996

[51] Int. Cl.$^6$ .................................................. F16K 31/12
[52] U.S. Cl. .................. 137/503; 137/505.13; 137/244; 251/50
[58] Field of Search ......................... 137/505.13, 503, 137/498, 244, 460, 462; 251/50

[56] References Cited

U.S. PATENT DOCUMENTS

| | | | |
|---|---|---|---|
| 726,395 | 5/1903 | Bedworth | 137/244 |
| 942,112 | 12/1909 | Sprecher | 137/503 |
| 1,032,052 | 7/1912 | Evans | 137/505.13 |
| 1,119,287 | 12/1914 | Krichbaum | 137/505.13 |
| 1,491,622 | 4/1924 | Pickop | 137/244 |
| 1,891,547 | 12/1932 | Krichbaum | 137/505.13 |
| 3,732,889 | 5/1973 | Conery | 137/505.13 |
| 3,870,436 | 3/1975 | Remy | 137/505.13 |
| 4,250,915 | 2/1981 | Rikuta | |
| 4,791,956 | 12/1988 | Kominami | 137/503 |
| 5,105,850 | 4/1992 | Harris | |
| 5,423,344 | 6/1995 | Miller | 137/505.13 |

*Primary Examiner*—Denise L. Ferensic
*Assistant Examiner*—Ramyar Farid
*Attorney, Agent, or Firm*—James G. O'Neill

[57] ABSTRACT

A fluid flow device has a body which includes an inlet and an outlet with a valve seat therebetween. A valve stem having a valve member thereon is mounted in the body, and the valve member is operably connected to a diaphragm which separates a region within the body into a pair of separate pressure chambers. A fluid passage is formed in the body communicating one pressure chamber with upstream pressure in the inlet, while the other pressure chamber communicates with downstream pressure in the outlet. A pressure differential between the chambers will normally hold the valve member in an open position against the action of a biasing means, until the pressure differential reaches a predetermined amount, whereby the valve member is slowly closed until fluid flow through the device is stopped. The valve seat and valve member do not form a perfectly tight seal so as to allow some leakage thereby allowing restricted fluid flow into the downstream side of the device and any system connected thereto, to prevent the system from being emptied.

3 Claims, 6 Drawing Sheets

FLUID FLOW FUSE

BACKGROUND OF THE INVENTION

1. Field of the Invention

This invention relates generally to fluid control devices, and, more particularly, to a fluid flow fuse for stopping the flow of a fluid in a system when the flow rate through the fuse exceeds a predetermined amount.

2. Description of Related Art

Many fluid systems, such as water sprinkler systems used in lawns, at golf courses, on freeway embankments, in housing tract common areas, in gardens, etc., are typically laid out with groups of sprinkler heads which are controlled by one or more shutoff valves. The shutoff valves may be manual, but in larger systems are usually electrically operated, such as a solenoid operated valve. In presently known systems, when a sprinkler head breaks, or the line feeding the sprinkler heads breaks, a large flow of water results and continues until the shutoff valve for the line having the break, is closed. Many attempts have been made to solve the problems that occur when such breakage occurs to, among other things, prevent wasting water.

One such prior art device is shown in U.S. Pat. No. 5,105,850 to Harris, which discloses a valve housing having an inlet and an outlet and a valve assembly mounted in the housing to control fluid flow between the inlet and the outlet. A valve seat is mounted in the housing and a valve stem guide having a plurality of passages permitting fluid flow therethrough is also mounted in the housing. An adjustable bolt having a hollow bolt shaft extends into the housing and the valve stem extends into the hollow bolt so as to guide the valve stem. The valve stem extends from the hollow bolt through the valve seat and a plunger is mounted to the valve stem upstream from the valve stem. A stop is mounted on the valve stem to limit motion of the valve stem and a spring is retained between the end of the adjusting bolt and the stop to bias the plunger away from the valve seat. The spring is arranged such that a predetermined fluid flow rate produces a force on the plunger sufficient to move it into to contact with the valve seat and shut off fluid flow. However, a number of problems have been found with this device, including the fact that if the water pressure downstream drops too quickly, the valve is immediately closed, thus causing uneven performance and which may result in water hammer.

A number of prior art devices are known which act solely as pressure regulators of various forms and functions, while some known prior art devices control the flow of the fluid through the device. One such fluid flow device is shown U.S. Pat. No. 4,250,915 to Rikuta, which discloses an automatic fluid control valve for maintaining a substantially constant fluid flow rate. This device includes a partition wall within a valve casing between a fluid inlet and a fluid outlet. A restriction adjusting member is mounted movably in the valve casing and includes a tapered end movable relative to a valve port in the partition wall to define a restricted passageway for fluids, with the adjacent walls of the valve port. A valve stem is movable within the casing and has a valve thereon cooperable with the valve port to regulate the flow of fluid therethrough in response to changes in fluid pressure differential. A diaphragm is operably connected to the valve stem and separates a region within the valve casing into a pair of pressure-differential chambers, and a fluid passage is formed in the casing communicating one pressure-differential chamber with the inlet chamber, while the other pressure-differential chamber communicates with the downstream side of the valve port. This valve, however, is always trying to maintain the same flow rate, and does not shut off flow of fluid therethrough if the downstream pressure drops dramatically.

Therefore, there exists a need in the art for a "water flow fuse" to sense the fact that an abnormally high flow exists, and to then shut off the flow of fluid through the valve, automatically, after a built-in, mandatory time delay. With the use of the fluid flow fuse as disclosed herein, the fluid flow fuse is not operated so rapidly as to cause water-hammer. That is, the improved device of the present invention controls the stopping of the fluid flow more smoothly, allows the downstream system to be, or to remain, filled and eliminates the water hammer that occurs with known prior art devices.

SUMMARY OF THE INVENTION

It is, therefore, a general object of the present invention to provide an improved and simplified fluid flow device. It is a particular object of the present invention to provide an improved fluid flow device which operates more smoothly. It is another particular object of the present invention to provide an improved fluid flow device utilizing a control means acting against a compression spring or other biasing means to control fluid flow without water hammer. It is a further particular object of the present invention to provide a device which senses the flow rate of a fluid passing through the device and to close the device when the rate of flow reaches a predetermined amount. It is a still a more particular object of the present invention to provide a water flow device which will close slowly upon sensing a rate of water flow above a predetermined amount. And, it is yet another particular object of the present invention to provide a fluid flow device which will close slowly upon sensing a rate of water flow above a predetermined amount, and which resets itself when upstream pressure is removed.

These and other objects and advantages of the present invention are achieved by providing a fluid flow device having an inlet, an outlet with a valve seat therebetween. A valve stem has a valve member thereon, and the valve member is operably connected to a diaphragm which separates a region within a housing of the fluid flow device into a pair of pressure chambers. A fluid passage is formed in the housing communicating one pressure chamber with the inlet, while the other pressure chamber communicates with the downstream pressure in the outlet. A pressure differential between the chambers will normally hold the valve member in an open position against the action of a biasing means, until the pressure differential between the chambers reaches a predetermined amount, whereby the valve member is slowly closed until fluid flow through the device is substantially stopped. The valve seat and valve member do not form a perfectly tight seal so that there is some leakage therethrough to allow the valve to reset itself, after any upstream shutoff valve is shut, by allowing any trapped fluid on the upstream side of the device to bleed down, thus relieving upstream pressure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
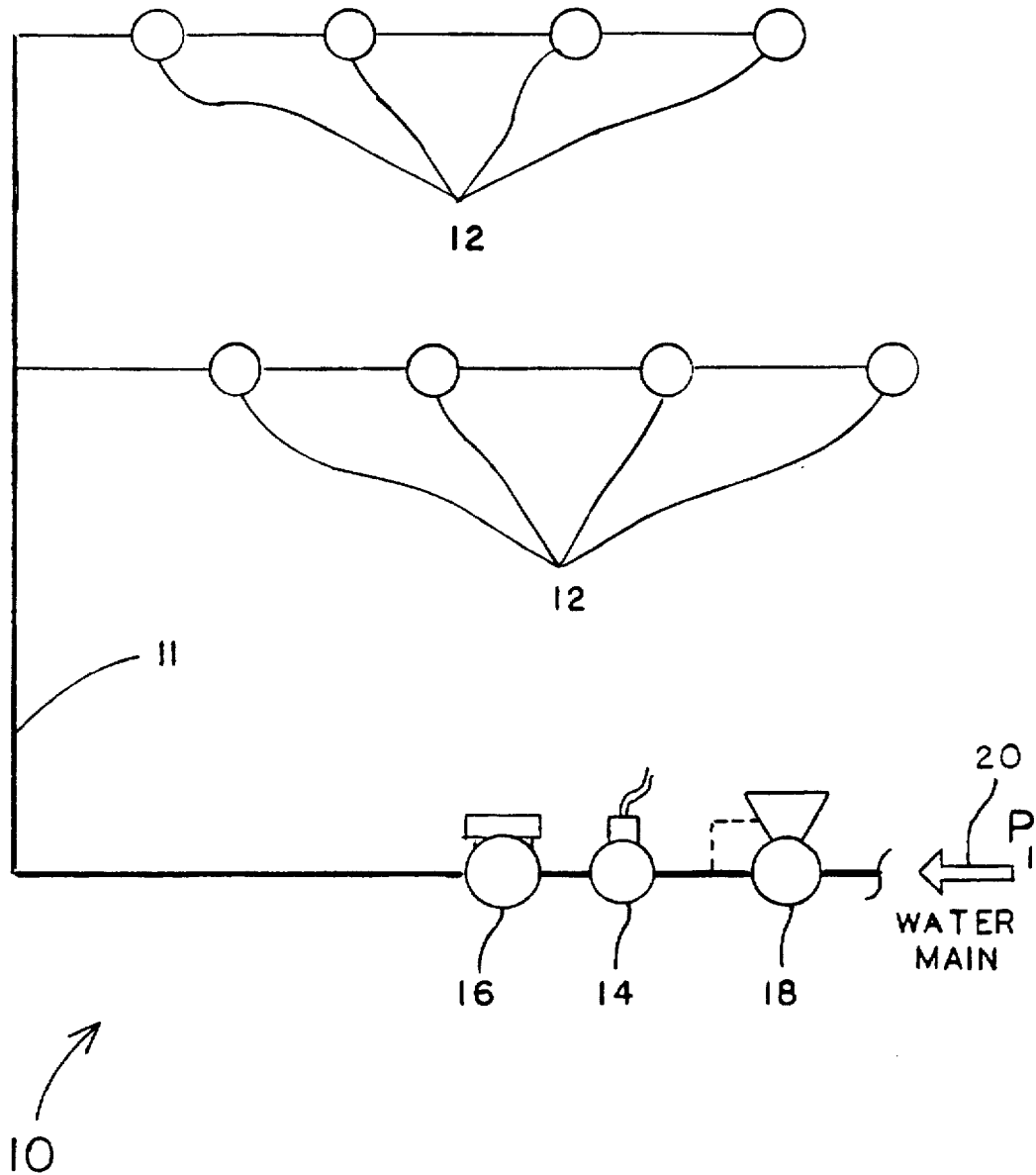
FIG. 1 is a schematic of a sprinkler system having a fluid flow device of the present invention therein.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified fluid flow device.

In the drawings, each of the figures has been marked with arrows to show the direction of fluid flow. Also, upstream pressure is indicated by $P_1$, and downstream pressure is indicated as $P_2$. When fluid is flowing through a fluid flow device of the present invention, $P_1$ must be higher than $P_2$. Furthermore, the difference between $P_1$ and $P_2$ increases as the rate (quantity per unit of time) of flow increases. This is a fundamental principle of fluid mechanics.

The fluid flow devices of the present invention are designed to be used in a fluid system, such as in a lawn sprinkler system shown schematically in FIG. 1. When such a system is first turned on, as by operating a shutoff valve 14 mounted upstream of a fluid flow device 16, the fluid flow device will be open as shown in FIGS. 2 through 6. As the flow rate increases through the fluid flow device, the pressure difference between $P_1$ at the device inlet and $P_2$ at the device outlet, will increase with the flow. However, the pressure sensed on top of a control or operating means, such as a diaphragm, piston, or the like will not immediately become $P_1$, as the fluid must flow through a small passageway and a restricted orifice, connecting the same to the upstream flow. The use of this small passageway and restricted orifice creates a time delay. The time delay is proportional to the area of the diaphragm or other operating device used and the stroke, or how far a valve member must travel to reach a valve seat. The time delay is inversely proportional to the size of the passageway and restricted orifice.

When a steady state flow has been reached in a device of the present invention, at a value below that at which the device has been set to close, the pressure $P_1$ will also exist in a chamber above or on top of the diaphragm and $P_2$ will also exist on an annular area below the diaphragm. $P_1$ will also be felt upon any open central areas on the lower surface of the diaphragm and/or a valve member. The pressure difference across the annular area of the diaphragm creates a force trying to move the diaphragm connected to the valve member downward toward a valve seat. This force is opposed by any biasing means, such as a spring within the device, and for the normal open condition of the device, the biasing or spring force must be larger than the pressure forces on the diaphragm so that the valve will remain in a full open position. When fluid flow through the fluid flow device of the present invention increases above a predetermined amount (such as when a sprinkler head breaks off in a sprinkler system), the differential pressure force exceeds a preset spring force and a valve member will start to close. As the valve member moves towards the valve seat, the spring is compressed and the force it exerts increases. At the same time, since the opening allowing fluid flow through the valve seat is also getting smaller, the pressure drop from $P_1$ to $P_2$ will increase. The spring rate of the spring is selected so the spring force does not increase as fast as the pressure drop force does. When this is true, the valve will close slowly and fully.

In the fully closed position, the valve member and the valve seat are designed to cooperate so that they do not achieve a completely tight seal. This permits pressure to bleed down when the upstream shutoff valve is closed and hence the fluid flow device of the present invention will eventually reopen.

Referring now to FIG. 1, there shown is a sprinkler system 10 having a line 11, with a plurality of sprinkler heads 12, a shutoff valve 14, a water flow device or fuse 16, and a pressure regulator 18 therein. The line 11 is connected to a water supply, such as a water main 20. Water flows into the line 11 in the direction of the arrow at an upstream pressure $P_1$. The flow fuse 16 may take any desired form or shape, and will be installed in the delivery line 11 just downstream or after the shutoff valve 14, so that when the shutoff valve is open, the water flow fuse will permit the line 11 and sprinkler heads 12 to fill with water. However, if one of the sprinkler heads 12 is broken off or the line 11 is broken, or subsequently breaks, as explained above, after a few seconds delay, the water flow fuse will close, thereby stopping the flow of water into line 11, after the water flow fuse.

Figure 2:
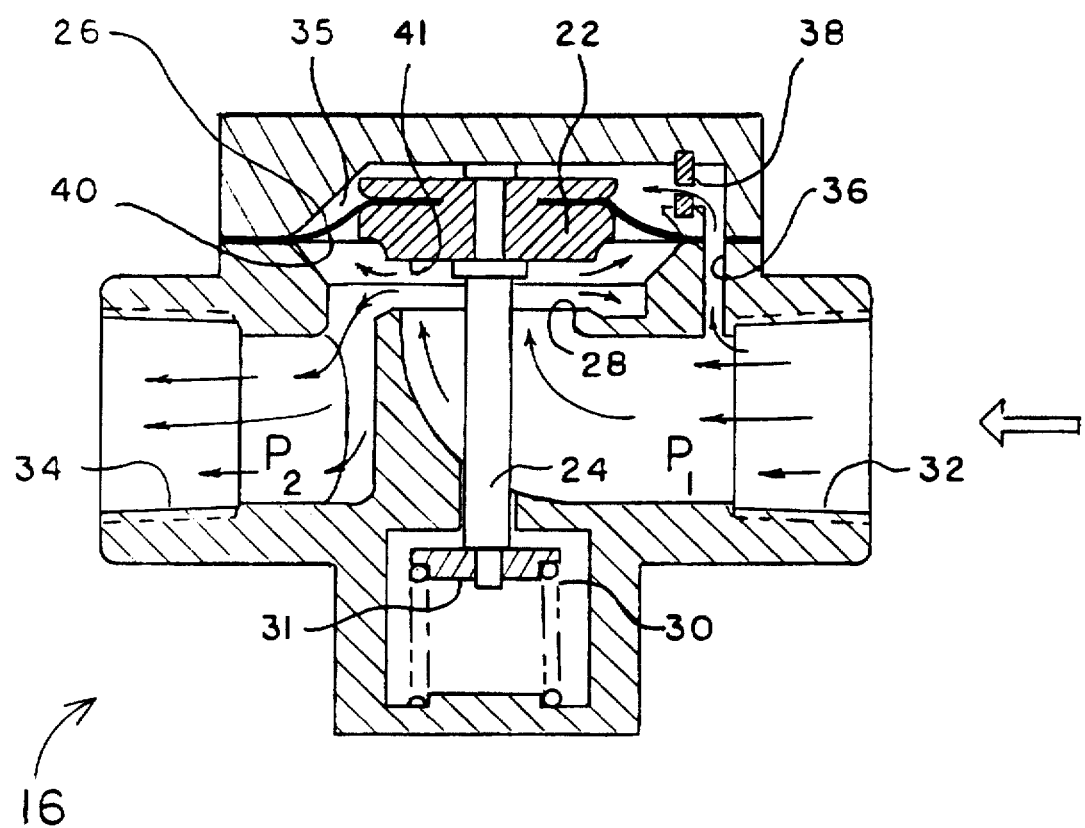
FIG. 2 is a cross sectional view of a schematic representation of a first embodiment of a fluid flow fuse of the present invention.

Turning now to FIG. 2 there shown in cross section is a schematic representation of a first embodiment of the water flow fuse 16 of the present invention. It should be again pointed out that the water flow fuse 16 of the present invention is not intended for use to regulate the flow rate in a fluid system. Within a wide range of flow rates the water flow fuse of the present invention does nothing. The flow can be whatever the system demands. The devices of the present invention, however, do recognize when a sudden maximum permissible flow is reached. The present invention does not regulate the value of fluid flow, and does not close slightly to maintain a preset value. When, however, a preselected rate of flow is exceeded, the water flow fuse of the present invention will close entirely to stop flow. This closing will not be instantaneous, but will occur after a predetermined period of time.

As shown in FIG. 2, a valve or closing member 22, here depicted as a popper valve, is in the open position. This is the normal position of the valve member when the water flow fuse has no fluid flow, and/or when a normal steady state flow passes through the water flow fuse 16. However, when flow is too high, the valve member 22 and a supporting shaft or rod 24 will be moved by pressure on a diaphragm 26 toward a valve seat 28, against the action of a biasing means, such as a spring 30. When a fluid system, such as sprinkler system 10 having the water flow fuse 16 therein is first turned on, such as by the operation of the shut off valve 14, upstream of the fluid flow fuse 16, the fluid flow fuse will be in the open position shown in FIG. 2. As the flow rate increases, the pressure differential between $P_1$ on the upstream side, at inlet 32, and $P_2$ at the downstream side, or outlet 34, will increase along with the flow. The upstream pressure of the fluid will also be transmitted to a first pressure cavity or chamber 35, formed above diaphragm 26 in the body of device 16, via a small passageway 36 having one or more restricted orifices, such as 38, therein. Because of the sizes of the passageway 36 and the restricted orifice 38, the pressure acting on the top or upper surface of the diaphragm in the cavity 35 does not immediately equal that of $P_1$, thus creating a time delay which may be calculated, in a manner well known to those skilled in the art, depending on various pressure and flow rates, and the size of the passageway 36 and the orifice 38.

When a steady state flow rate has been reached, at a value below that at which the fluid flow fuse has been set to close, the pressure $P_1$ both in the cavity 35 above the diaphragm and on a lower surface 41 of valve member 22, and the downstream pressure $P_2$, felt on an annular area 40 below the diaphragm 36, will be substantially equal, except for the normal drop in pressure across the valve seat 28. Any differences will be made up by the spring 30. That is, the pressure within cavity 35 creates a force trying to move the diaphragm 26 and the attached valve member 22 toward the valve seat 28. However, this force is opposed by the force or pressure against annular area 40, surface 41, and the force of the spring 30 against a plate 31 connected to shaft 24, so that the valve member 22 remains in the open position. It is to be understood that the restricted orifices 38 and spring 30 are dimensioned and sized so as to produce the most favorable results.

When the flow increases above a preselected value, such as when a head 12 breaks off in the sprinkler system 10, the differential pressure force thus caused between $P_1$ and $P_2$ exceeds the preset spring force 30 and the valve member 22 will start to close. Once started, the valve member will continue to close, at a predetermined rate, until it is fully closed against valve seat 28. After closure, some fluid is allowed to bleed through the valve seat since the valve seat and valve member are not completely sealed.

Figure 3:
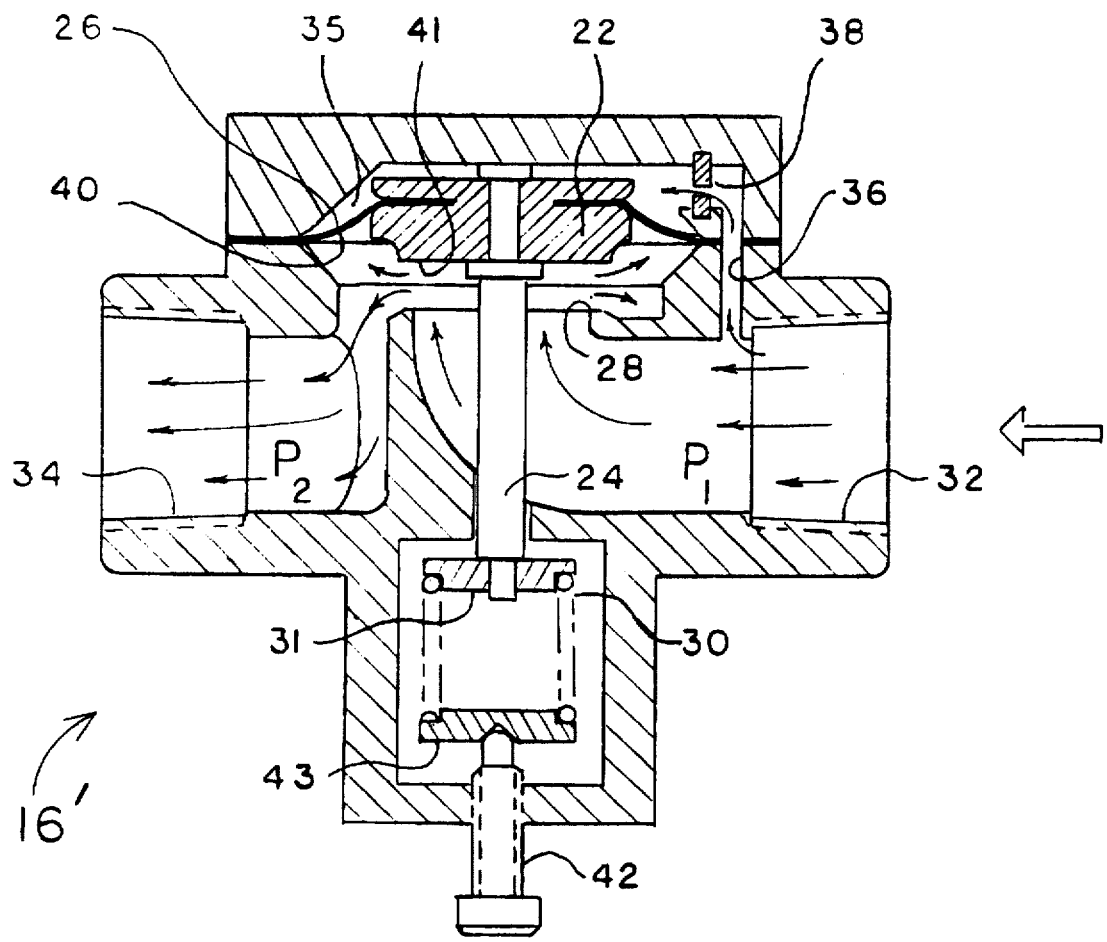
FIG. 3 is a further cross-sectional view of a schematic representation of a second embodiment of a fluid flow fuse of the present invention.

Referring now to FIG. 3, a fluid flow fuse 16' as shown therein is substantially identical to that shown in FIG. 2, except for the addition of an adjusting screw 42, and a further spring holding plate 43. The adjusting screw 42 is used to move plate 43, with respect to plate 31, to vary the spring force of spring 30 and to thereby selectively control the flow rate at which the fluid flow fuse will close.

Figure 4:
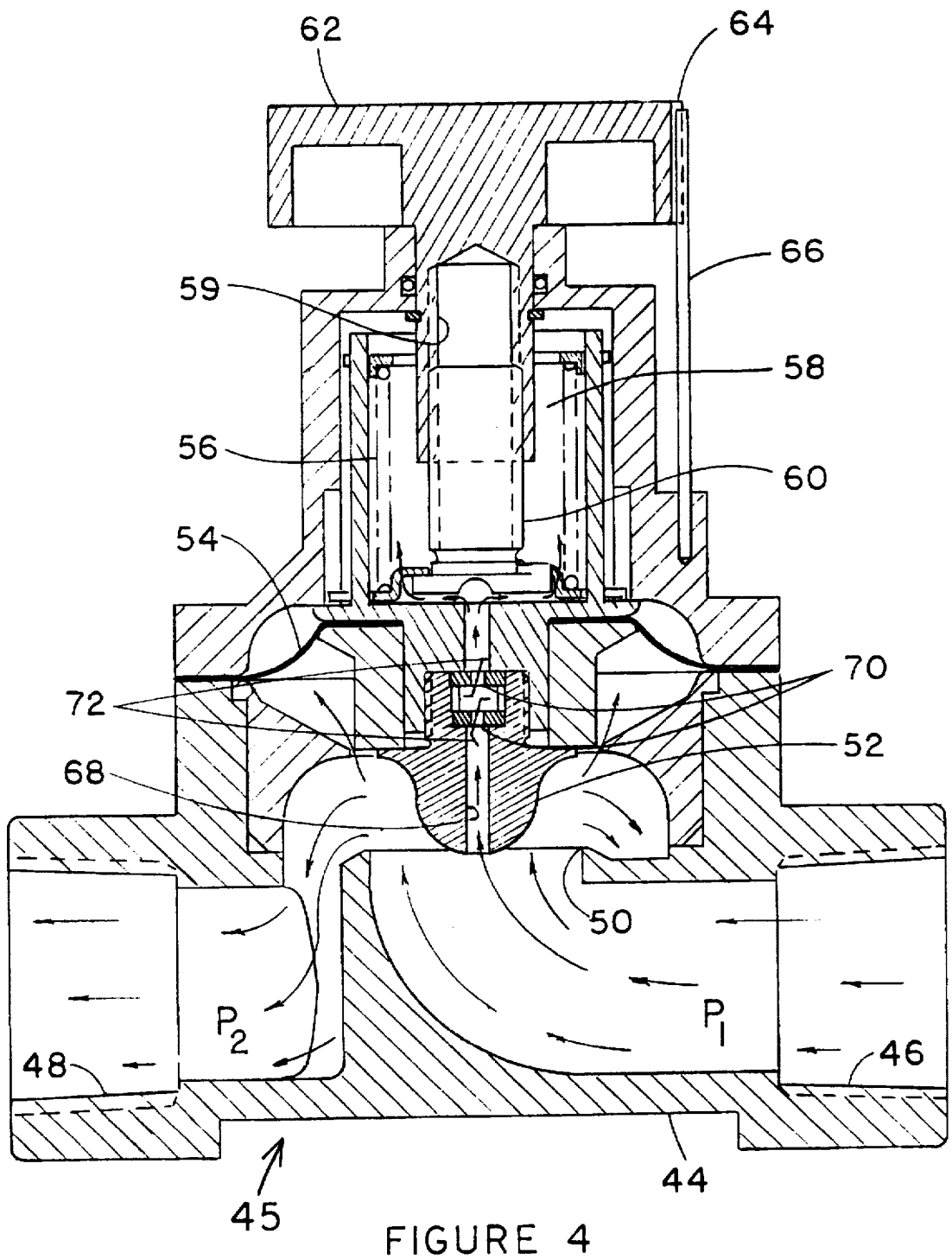
FIG. 4 is a cross-sectional view of a third embodiment of a fluid flow fuse of the present invention.

Turning now to FIG. 4, there shown is a further embodiment of a fluid flow fuse of the present invention generally identified by the numeral 45. The fluid flow fuse includes a housing 44 having an upper and lower portion, an inlet 46 and an outlet 48 with a valve seat 50 therebetween. A specifically shaped valve member, such as an elongated poppet valve 52 is slidably mounted within the housing 44 and includes a diaphragm 54 secured between the upper and lower portions of the housing 44. A spring 56 is held within a cavity 58 in the upper portion of the housing 44 so as to bias both the diaphragm and the valve member upwardly, away from the valve seat 50.

An adjusting means, such as a knob 62 secured to a portion having internal screw threads 59 therein, cooperates with external screw threads formed at the top of a shaft 60 which engages the spring, to thereby load the valve member 52. This adjusting means enables the knob 62 to adjust the valve member and spring relative to each other. The exterior surface of the knob 62 may be provided with a plurality of openings or detent means 64 which cooperate with a means, such as a cantilever spring 66 secured within the top portion of the housing 44 so that a user turning the knob may count the clicks, i.e., the movement of the cantilever spring from one detent to the other, and thereby keep track of the amount of adjustment made by turning the knob.

The lower surface or face of the valve member 52 is specifically sized, dimensioned and shaped so as to control the flow of fluid through the valve seat 50 and thereby control the pressure drop versus stroke characteristics of this device, and to further control the time delay that may be achieved.

Furthermore, valve member 52 is provided centrally thereof with a passageway 68 having a plurality of restricted orifices 70 therein. In the embodiment shown, there are two orifices 70 in series and each of the orifices includes a loose wire 72 captured therein. The loose wire is sometimes referred to as a "wiggle wire" so that each orifice may be somewhat larger and the wire moves as the fluid flow goes past, therefore, cleaning the orifices. The internal passageway 68 continues after the orifices 70 and is fluidly connected to upper chamber 58, behind the diaphragm 54, so that upstream pressure $P_1$ from the inlet 46 is eventually felt within the chamber 58, after a delay, as discussed above.

Figure 5:
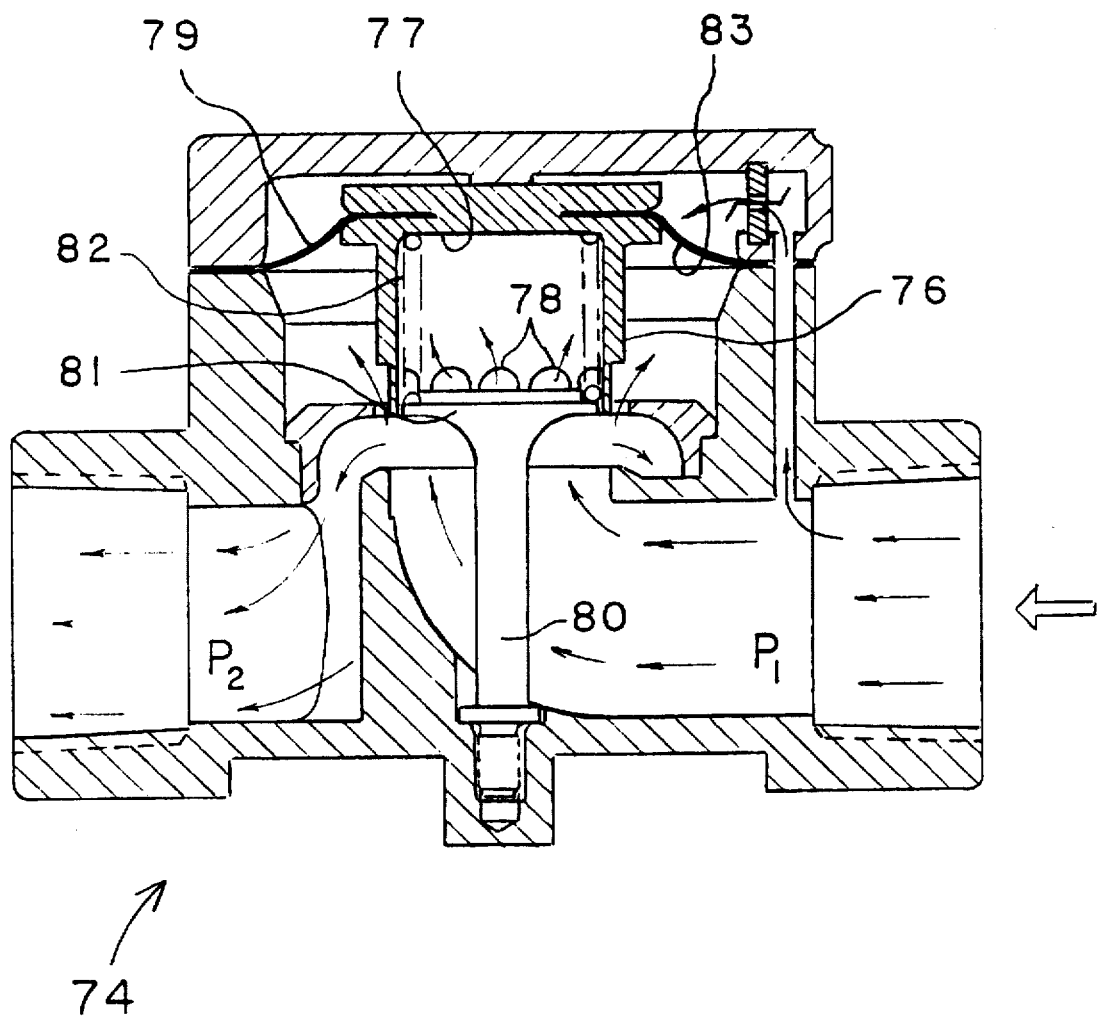
FIG. 5 is a cross sectional view of a schematic representation of a fourth embodiment of a fluid flow fuse of the present invention.

Turning now to FIG. 5, there shown is a still further embodiment of a fluid flow fuse 74 of the present invention similar to the device of FIG. 2, with the exception that a different type of valve member 76 is held therein. The valve member 76 is preferably shaped as a sleeve type member having a hollow cylinder with a plurality of openings or slots 78 spaced therearound. Slots 78 may take any desired form or shape, and provide the device of this FIG. 5 with several advantages. First, because the sleeve valve 76 is guided on a guide means, such as that shown, composed of a rod 80 and an enlarged head 81 captured within the sleeve member 76, the stroke of the valve member may be longer (for example, two times the stroke of the valve member shown in FIG. 2). Furthermore, the slots 78 may be configured to give desirable stroke versus pressure drop characteristics and, the pressure forces acting on a diaphragm 79 and the valve member 76 in the open position are very different from those shown in the devices of FIGS. 2 through 4. In the device of FIG. 5, the outlet or downstream pressure P2 acts across the entire lower surface or side 77 Of the valve member 76 and an annular area 83 of diaphragm 79. Therefore, as the valve member 76 of the device of FIG. 5 approaches the closed position, the pressure on the lower surface 77 of the valve member will change from $P_2$ to $P_1$. This change gives a lower net force in the closed position. These two facts make it easier to match the spring characteristics of a spring 82 held within the valve member 76 between the enlarged head 81 and the lower surface 77.

Figure 6:
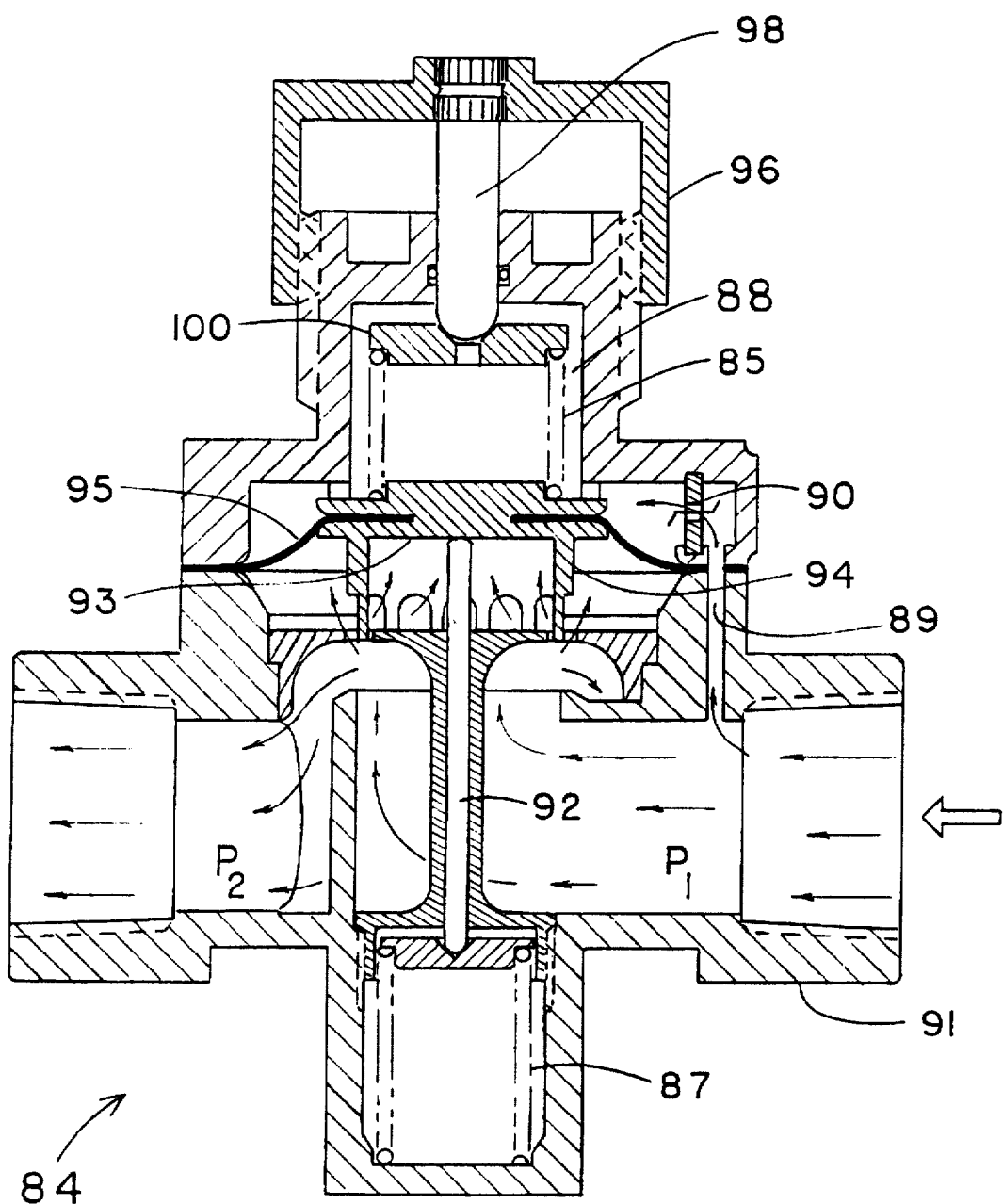
FIG. 6 is a cross sectional view of a schematic representation of a fifth embodiment of a fluid flow fuse of the present invention.

FIG. 6 shows a still further device 84 that functions substantially the same as that of the device 74 shown in FIG. 5. However, the device 84 also includes an adjusting means for a bias spring 85 used therein. The adjustment means used in FIG. 6 is different from the adjusting means used in the devices of FIGS. 2 and 4 and uses 2 springs rather than 1. This simplifies the mechanism while permitting an adjusting knob 96 to remain on top of the device when the device is installed in a fluid system such as sprinkler system 10, where it is most accessible. In this configuration, the bias spring 85 is placed in a top chamber 88, connected to upstream pressure by a passageway 89 and an orifice 90 having a wiggle wire therein. A second or load spring 87 is contained in an opening in a lower part of a housing 91, and is set to control the maximum flow at which the device will be shut off. A movable central shaft or rod 92 is connected between a lower surface 93 of a sleeve valve member 94. The bias spring 85 is preferably mounted above, and acting on an upper surface of a diaphragm 95, and is adjusted by the knob 96 secured to a threaded surface formed on the outside of an upper portion of the housing. The adjusting knob 96 moves or turns a central extending member 98, which in turn coacts with the upper surface of a spring holding means 100, whereby, when the adjusting knob is turned in one direction, the bias spring 85 will be compressed, and when turned in the other direction, the bias spring will be decompressed or released. It, therefore, can be seen that by compressing the bias spring 85, an increased force will be achieved and the net upward force on the diaphragm and valve member 94 can be reduced, resulting in a lower fluid flow setting.

Thus, there have been described a number of embodiments of an improved and simplified fluid flow fuse for use in a fluid system, such as a sprinkler system. The fluid flow fuses of the present invention are easily installed and used, and may be easily replaced if problems occur. Furthermore, the fluid flow fuses of the present invention provide a time delay when filling and/or closing the system, and allow some leakage of water after being closed to allow the fluid flow fuse to reset after upstream pressure is bled down.

Those skilled in the art will appreciate that various adaptations and modification of the just-described preferred embodiments can be configured without departing from the scope and spirit of the invention. Therefore, it is to be understood that, within the scope of the appended claims, the invention may be practiced other than as specifically described herein.

What we claim is:

1. A water flow fuse for automatically shutting off an excessive rate of flow of water in a system, comprising:

a valve body having a water inlet passage and a water outlet passage fluidly connected by a valve seat opening;

a pressure measuring passageway formed in said valve body and connected between said water inlet passage and a pressure sensing chamber;

at least one restricted orifice formed in said pressure measuring passageway:

a combination poppet and sleeve valve member connected to a diaphragm movable between a normally open position and a closed position against said valve seat opening; said combination poppet and sleeve valve member including a cylindrical, hollow element having two ends with a closed top formed at a first of said two ends and a plurality of openings formed at a second of said two ends;

said diaphragm sealingly connected between said valve body and said top closed portion of said combination poppet and sleeve valve member, downstream of said valve seat, toward said water outlet passage, so that a lower area of said diaphragm is subject to varying pressures adjacent said water outlet passage and a separate upper area of said diaphragm forms a portion of said pressure sensing chamber;

a fluid chamber downstream of the valve seat opening and surrounding the cylindrical, hollow element, defined by the lower area of said diaphragm and an annular projection extending inwardly from the valve body;

a pair of springs cooperating with said combination poppet and sleeve valve member; and said combination poppet and sleeve valve member and said pair of springs being sized and dimensioned so that when a predetermined pressure differential is sensed said combination poppet and sleeve valve member is moved from a full open position toward a closed position; and whereby in said full open position said plurality of openings formed at said second of said two ends communicates between a volume of water within said cylindrical, hollow element and an annular volume of water within said fluid chamber; and when in a partially closed position said plurality of openings formed at said second of said two ends communicates upstream water pressure with downstream water pressure, while isolating said annular volume of water within said fluid chamber, thereby slowing travel of said combination poppet and sleeve valve member toward said valve seat; and said combination poppet and sleeve valve member is finally moved to said fully closed position, against said valve seat, without causing water hammer; and means in said combination poppet and sleeve valve member loosely cooperating with said valve seat in said fully closed position so as to allow some leakage of water by said combination poppet and sleeve valve member, to enable said combination poppet and sleeve valve member to automatically reset itself to said normally open position when pressure applied thereto has been relieved.

2. The water flow fuse of claim 1, further including a first adjusting means cooperating with a first of said pair of springs so as to adjustably control the opening characteristics of said valve member.

3. The water flow fuse of claim 2, further including a second adjusting means mounted on the exterior of said valve body and cooperating with a second of said pair of springs, and wherein said second of said pair of springs is held in said pressure sensing chamber above said diaphragm.

* * * * *